United States Patent [19]

Mueller et al.

[11] 4,136,563
[45] Jan. 30, 1979

[54] DIGITAL VOLUMETRIC FLOW RATE MEASUREMENT OF A FLOWING FLUID

[75] Inventors: Frederick N. Mueller, Dallas; Ronald W. Chandler, Plano, both of Tex.

[73] Assignee: Tetradyne Corporation, Carrollton, Tex.

[21] Appl. No.: 838,082

[22] Filed: Sep. 30, 1977

[51] Int. Cl.² ............................................... G01F 1/70
[52] U.S. Cl. .................................................. 73/194 E
[58] Field of Search ......................... 73/194 E, 194 F; 324/30 B

[56] References Cited

U.S. PATENT DOCUMENTS

| 3,324,720 | 6/1967 | Sutherland | 73/194 |
|---|---|---|---|
| 3,722,276 | 3/1973 | Chandler | 324/30 |

*Primary Examiner*—Herbert Goldstein
*Attorney, Agent, or Firm*—Richards, Harris & Medlock

[57] ABSTRACT

The specification discloses a digital method for measuring the volumetric flow rate of a flowing fluid, utilizing the change in electrical conductivity produced in a fluid by the introduction of a predetermined quantity of electrolyte. A temperature sensitive conductivity probe has an oscillator with an output signal frequency directly proportional to the conductivity of the fluid flowing between the electrodes of the probe. The conductivity probe is disposed in the fluid downstream from the point at which the electrolyte is introduced to alter the electrical conductivity of the fluid. The circuitry measures the increase in conductivity caused by the electrolyte during the period of time it takes the electrolyte to pass the conductivity probe and subtracts the integral of normal conductivity to determine the integral of conductivity produced by the electrolyte. The volumetric flow rate of the fluid is calculated directly by dividing a flow constant, determined by the number of equivalents of electrolyte introduced, by the integral of the conductivity. A digital display provides direct indication of the flow rate. The device can also determine whether too much or too little electrolyte has been introduced for accurately measuring the volumetric flow. The conductivity probe signal can be converted to indicate and display directly the conductivity of the fluid to visually determine the width of the conductivity peak. The period of time for integrating the change in conductivity produced by the electrolyte in solution with the field can be adjusted and the circuitry can be reset for additional measurements.

26 Claims, 5 Drawing Figures

DIGITAL VOLUMETRIC FLOW RATE MEASUREMENT OF A FLOWING FLUID

FIELD OF THE INVENTION

This invention relates to the measurement of volumetric flow rate, and more particularly relates to a digital method for measuring the volumetric flow rate of a flowing fluid by introducing into the fluid a predetermined quantity of electrolyte which increases the electrical conductivity of the fluid.

DESCRIPTION OF THE PRIOR ART

Volumetric flow meters are used in a number of applications where it is desirable to determine the quantity of a flowing fluid. Such a determination is often unnecessary for knowing the processing steps in treating a flowing fluid, such as the quantity of chemicals to introduce into the fluid to alter its chemical properties. For example, the processing steps of a sanitary sewer system require the measurement of the volumetric flow rate to effectively process the sewage.

Previous volumetric flow meters have operated by relying on the technique described in Engineering Hydraulics, published by John Wiley & Sons, Inc., New York, N.Y. 1949, pp. 208–209. The operating principles for such flow meters are based on solving the equation:

$$Q = \frac{E}{K \int_0^t L dt},$$

wherein
Q = the volumetric flow rate,
E = the number of electrolyte equivalents,
K = a predetermined constant, and
L = the change in conductivity of the flowing stream produced by the electrolyte.

If the quantity of electrolyte added in solution to the fluid is known, then the value of E divided by K is known and the volumetric flow rate may be calculated by measuring only the integral of the change in conductivity caused by the introduction of the electrolyte. U.S. Pat. No. 3,722,276 is an example of an analog volumetric flow meter utilizing such an operating principle.

Previous volumetric flow meters, such as the one described in U.S. Pat. No. 3,722,276, possess a number of limitations which are overcome by the volumetric flow meter of the present invention which utilizes digital circuitry. The operational amplifiers utilized in the analog volumetric flow meter are inherently unstable in operation over an extended period of time, causing a drift in the null setting for the base line conductivity. The analog volumetric flow meter requires the operator to balance a bridge circuit so that the meter is centered to indicate a 0 or null state of operation for the system. Drifting of the base line conductivity in such analog volumetric flow meters may also occur from the temperature variations of the fluid altering its conductivity. In addition, reading of the analog volumetric flow rate requires the operator's interpretation of the meter which limits the accuracy of the reading.

SUMMARY OF THE INVENTION

In accordance with the present invention, a method and system is provided which overcomes or eliminates many of the problems associated with the prior art techniques described above. The present invention provides a volumetric flow meter utilizing digital circuitry to solve the equation $$Q = \frac{E}{K \int_0^t L dt}$$

to provide more accurate and reliable readings of the volumetric flow rate than was possible with such prior art devices described above. The digital flow meter utilizes no operational amplifiers and eliminates the drift problem associated with the prior art analog flow meters. In addition, the conductivity probe of the digital flow meter includes temperature compensating circuitry for adjusting the conductivity reading to the temperature variations in the fluid. The integrating circuitry of the present invention further includes means for automatically eliminating the base line conductivity, overcoming the time consuming and often inaccurate method of manually balancing the bridge circuit of the analog system. The digital flow meter of the present invention also includes circuitry for indicating when an excess or insufficient amount of electrolyte has been introduced into the flowing fluid. The volumetric rate of flow calculated by the digital flow meter is directly readable on a digital display, improving the accuracy of the reading.

In accordance with the present invention, a method is provided for measuring the volumetric rate of flow of a flowing fluid which includes placing a conductivity probe into the fluid where the conductivity probe has an oscillator with a frequency proportional to the conductivity of the fluid. The base line conductivity of the fluid is determined and a predetermined quantity of a known electrolyte material is introduced into the flowing fluid at a point upstream from the conductivity probe. A flow rate constant is determined based on the number of equivalents of the known electrolyte material introduced into the flowing fluid. The base line conductivity is accumulated by measuring the frequency of the output signal of the oscillator for a predetermined period of time. The integral of the fluid conductivity caused by the electrolyte and the fluid for a predetermined period of time is determined, and the base line conductivity is automatically deleted from said integral for determining the integral of change in conductivity caused only by the electrolyte material. The flow rate constant is then divided by the integral of the change in conductivity caused by the electrolyte for calculating the volumetric flow rate of the fluid.

In accordance with another aspect of the present invention, a digital volumetric flow meter is provided for determining the volumetric rate of flow of a fluid. The flow meter includes temperature compensating means for measuring at a point the change in electrical conductivity of the fluid produced by introducing a predetermined quantity of electrolyte upstream from said point for increasing the electrical conductivity of the fluid. Means are provided for storing a predetermined constant determined by the number of equivalents of electrolyte introduced into the fluid. Digital circuit means are provided for integrating the change in conductivity in the fluid caused by said electrolyte for the period of time electrolyte flows past said point, including means for automatically eliminating the base line conductivity of the fluid. Digital circuit means are also provided for dividing said constant by said integral of the change in conductivity caused by said electrolyte for automatically calculating the volumetric flow rate of the fluid.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
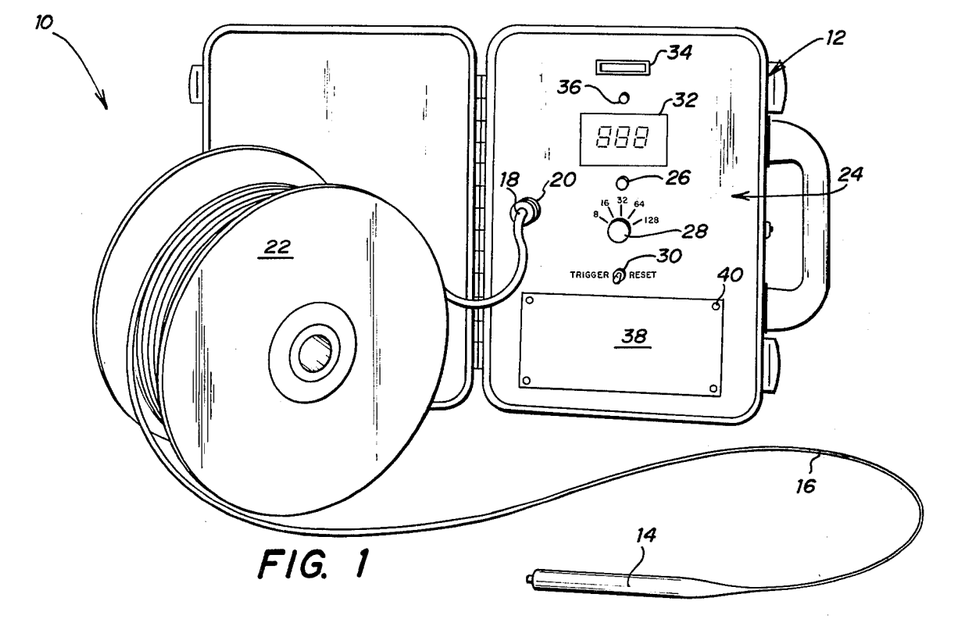
FIG. 1 is a perspective view of the digital flow meter of the present invention.

FIG. 1 is a perspective view illustrating the digital volumetric flow meter of the present invention, generally identified by the reference numeral 10. The digital volumetric flow meter 10 is shown displayed in a portable carrying case 12. The conductivity probe 14 is electrically connected through probe cable 16 terminating in probe plug 18 for electrically connecting the probe to the flow meter 10 through probe jack 20. A probe cable pick-up reel 22 is provided for storing the length of probe cable 16 when not in use, and reel 22 may be used for raising and lowering the conductivity probe 14 into the flowing fluid to be measured. The flow meter 10 is energized when plug 18 is inserted into jack 20.

An instrument panel cover 24 of the flow meter 10 includes a battery check/ready light indicator 26 which indicates that the battery output is satisfactory and the fluid base line conductivity has been determined by the flow meter 10. A time base selector switch 28 is provided for setting the period of time for accumulating the base line conductivity and for integrating the change in conductivity of the fluid. Switch 28 has settings from a minimum of 8 seconds to a maximum of 128 seconds. A trigger/reset switch 30 is provided for resetting the flow meter 10 for the start of another measurement and for manually triggering the flow meter 10.

A three digit display panel 32 is provided for displaying a direct digital readout of the volumetric flow rate as measured by the digital flow meter 10. The digital display 32 provides a direct reading of the volumetric flow rate in gallons per minute. The digital volumetric flow meter 10 may, of course, be adjusted by changing the constant $K_1 = E/K$ to provide a reading on another scale, including metric readings. The digital display 32 also provides an indication of an excess or insufficient quantity of electrolyte added to the flowing fluid by displaying either a "−" or a "+" sign in the display 32 to the left of the most significant digit position.

In addition, a conductivity meter 34 is provided for displaying a direct reading of the conductivity in micromhos as detected by the conductivity probe 14. A scale switch 36 is provided for altering the scale of the conductivity meter 34 to provide more accurate readings. The direct reading of the conductivity of the fluid displayed on meter 34 senses a conductivity peak caused by the presence of the added electrolyte, indicating that the electrolyte has arrived in solution from the point it was deposited in the flowing stream to the point where the conductivity probe 14 is placed in the fluid. The conductivity meter 34 thus provides an indication of the width of the conductivity peak. The conductivity meter 34 may thus be used in conjunction with setting the time base selector switch 28 for determining the shortest time base which is greater than the time it takes the electrolyte to pass probe 14.

The instrument panel 24 of the flow meter 10 includes an instrument panel cover plate 38 on which may be printed operating instructions. The cover plate 38 is fastened to the front of the instrument panel 24 by plurality of screws 40. The cover plate 38 may be removed to provide access to the flow meter 10 for purposes of calibration. After initial calibration, the digital flow meter 10 may be adjusted by changing the constant $K_1 = E/K$ stored in the flow meter 10.

Figure 2:
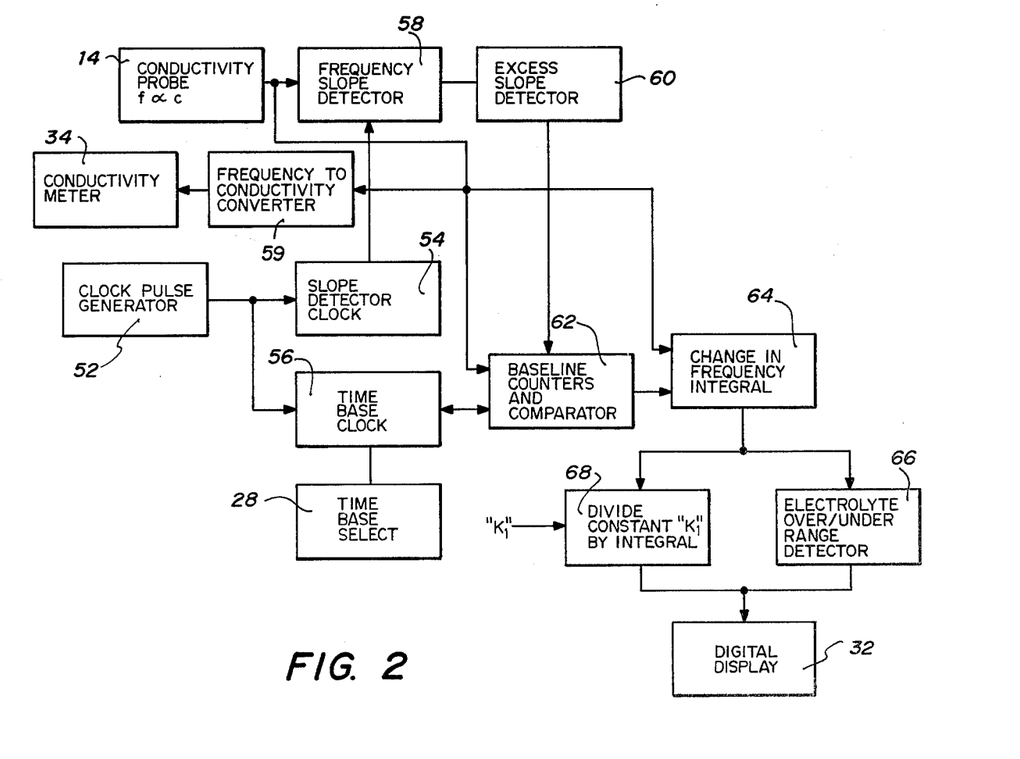
FIG. 2 is a block diagram of the present invention.

FIG. 2 is a block diagram of the preferred embodiment of the digital flow meter 10. The conductivity probe 14 provides an output signal of a frequency directly proportional to the conductivity of the fluid in which the probe 14 is immersed. The signal of the conductivity probe 14 is applied to a frequency to conductivity converter circuit 59 for providing a direct reading of the conductivity on the conductivity meter 34.

A clock pulse generator 52 provides a clock pulse signal to a slope detector clock 54 and a time base clock 56. The slope detector clock 54 provides a clock pulse signal of much shorter duration than that of the time base clock 56. A slope detector clock pulse signal of one-quarter of a second has proven satisfactory in actual practice. The time base clock 56 may be adjusted through the time base select switch 28 to provide an interval of time from a minimum of 8 seconds to a maximum of 128 seconds.

The slope detector clock 54 applies the clock signal of relatively short duration to the frequency slope detector 58 for detecting a change in frequency of the output signal from the conductivity probe 14. An excess slope detector 60 stores the maximum rate of change of frequency and indicates when the rate of change of the frequency exceeds that maximum. The excess slope detector 60 thus provides a signal to base line counters and comparator circuitry 62 that the electrolyte has reached the probe 14. The counters and comparator circuitry 62 accumulates and stores the output signal from the conductivity probe 14 in one counter and then the other counter, each accumulation occurring for a period of time determined by the time base clock 56, and it then compares the numbers in the counters. Upon the excess slope detector 60 sensing a conductivity peak or the start of the passage of the electrolyte in solution, the excess slope detector 60 zeros one of the base line counters and resets the time base clock 56 to zero. Thus, one of the counters of the circuit 62 stores the base line conductivity measured for the time base period determined by the time base select switch 28, while the other counter begins anew storing the output signal from conductivity probe 14 until one base line counter equals the other. Upon detecting such a condition, the counters and comparator circuitry 62 signals the change to frequency integral circuit 64 to begin accumulating the output signal of the conductivity probe 14 for the remainder of the time base period. The integral of the signal for the conductivity probe continues for the period of time determined by the time base select switch 28. Thus, the digital volumetric flow meter 10 of the present invention automatically subtracts the base line conductivity normally occuring in the flowing fluid and calculates the integral of the change in conductivity for the period of time chosen by setting the time base select switch 28.

If the integral of the change in conductivity for the electrolyte exceeds the capacity of the flow meter 10, an electrolyte over/under range detector 66 senses such an excess of electrolyte and displays a "−" sign in the digital display 32 to indicate that less electrolyte is to be added into the flowing fluid. Likewise, if too little electrolyte has been added to the flowing fluid to alter the conductivity, the electrolyte over/under range detector 66 detects the insufficiency and displays a "+" sign in the digital display 32, indicating the necessity of adding additional units of electrolyte to the flowing fluid.

In order to complete the computation of the volumetric rate of flow by solving the equation $$Q = \frac{E}{K \int_0^t L dt},$$

circuitry 68 is provided for dividing the preset constant "K1" by the integral of the change of conductivity to get a direct reading of the volumetric rate of flow through the digital display 32. If multiples of the number of equivalents of electrolyte used in determining K1 are introduced into the fluid, then the digital reading is simply multiplied by such multiple.

Figure 3:
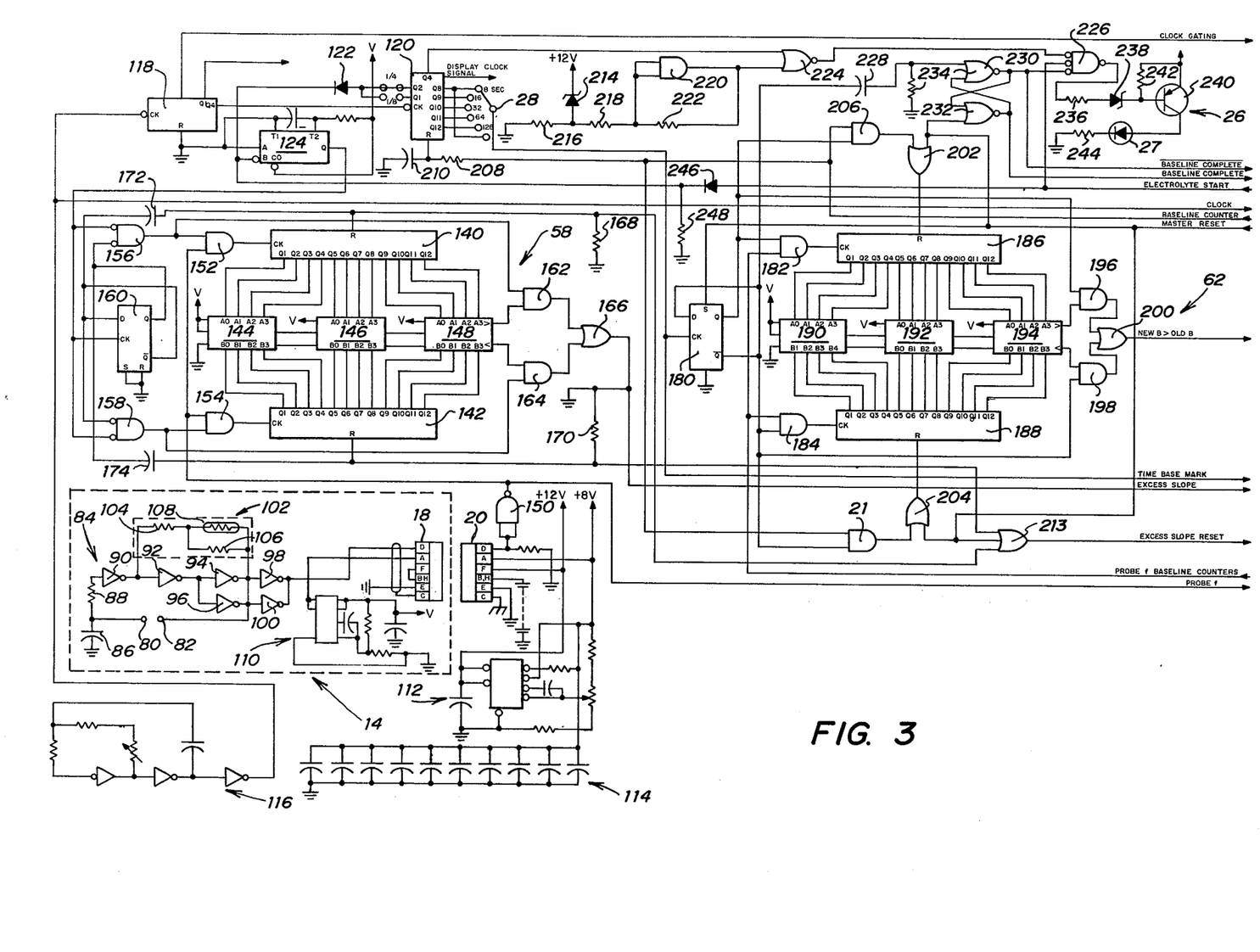
FIG. 3 is a schematic diagram of the digital circuitry of the preferred embodiment of the invention, including the conductivity probe, probe frequency slope detector, and base line accumulators and comparator.

FIG. 3 illustrates in schematic detail part of the electrical circuitry of the digital flow meter 10, including the conductivity probe 14, battery check/ready light 26, frequency slope detector 58, and base line counters and comparator circuitry 62. The circuitry for the conductivity probe 14 includes platinum electrodes 80 and 82 spaced apart and connected to probe oscillator 84. Probe oscillator 84 includes a capacitor 86 connecting electrode 82 to ground, and a resistor 88 connected in series to inverting amplifiers 90 and 92. The output of amplifier 92 is applied to parallel connected inverting amplifiers 94 and 96, where amplifiers 94 and 96 have their outputs connected to electrode 82 and to parallel connected amplifiers 98 and 100, which serve as line drivers for the output signal. The output signal of the probe oscillator 84 is applied to the flow meter 10 through probe plug 18 through probe jack 20.

The conductivity probe 14 includes a temperature compensating resistor circuit 102 connected on one side to the input of amplifier 92 and on the other side to the output of amplifiers 94 and 96. The temperature compensating circuit 102 includes resistor 104 connected in series with parallel connected resistor 106 and thermistor 108. The value of the resistors 104 and 106 is calibrated for each thermistor over the temperature range between 10 C° and 40 C°. If the temperature compensating circuit 102 were not included in the conductivity probe 14, the output frequency would vary as the temperature of the solution varies. For example, the resistance of the thermistor 108 of the temperature compensating circuit 102 decreases as it senses the temperature of the solution increasing to decrease the output frequency of the oscillator 84.

A probe voltage regulator 110 is provided to regulate the output voltage driven up the probe cable 16. In addition, a flow meter voltage regulator 112 is connected to a 12-volt DC battery supply for applying a constant level 8-volt direct current voltage to the remaining circuits of the flow meter 10. The voltage regulator 112 is connected to a plurality of decoupling capacitors 114 for discharging to ground any excess current sparks occurring throughout the electrical circuitry of the flow meter 10.

A digital flow meter oscillator 116 applies a clock pulse signal of 262,144 Hz as the primary clock pulse signal for the digital flow meter 10. The clock pulse signal of oscillator 116 is applied to a 14 stage divide by 2 flip-flop 118, where the output signal from terminal Q4 of flip-flop 118 is applied as the clock input pulse through a binary counter 120. Counter 120 has its output terminals Q8–Q12 connected to the terminals of the time base select switch 28 for selecting the time base from 8 to 128 seconds. Either output terminal Q1 or Q2 of counter 120 may be connected to diode 122 for providing a sample time select clock pulse signal of either ½th or ¼th of a second. In FIG. 3, terminal Q2 has been selected to provide a signal of duration of ¼th of a second. Diode 122 is connected to terminal B of a single shot multivibrator 124 for providing a narrow output pulse signal at terminal Q and applying it to the frequency slope detector circuitry 58.

The frequency slope detector 58 includes binary counters 140 and 142 having their outputs connected to cascade connected comparators 144, 146 and 148. The output signal from probe 14 is connected through NAND gate 150 to one input terminal of AND gates 152 and 154, which have their inputs connected to the clock input terminals of counters 140 and 142, respectively. The other terminals of AND gates 152 and 154 are connected to the outputs from NOR gates 156 and 158 which are controlled by the output signal from terminal Q of single shot 124 and flip-flop 160. The outputs of NOR gates 156 and 158 are also applied to one terminal of the AND gates 162 and 164. The second input terminal of AND gate 162 is connected to an output terminal of comparator 148, and the second input terminal of AND gate 164 is connected to the other output terminal of comparator 148. The outputs of AND gates 162 and 164 are applied to the input terminals of OR gate 166 which apply the Excess Slope signal to the excess slope detector 60. The counters 140 and 142 have their reset terminals connected to ground through resistors 168 and 170, respectively, and coupled through capacitors 172 and 174 to the Q and $\overline{Q}$ terminals of flip-flop 160.

Also illustrated in FIG. 3 is the base line counters and comparator circuit 62. The output from counter 120 is applied through time base select switch 28 to the clock input terminal of a flip-flop 180. The output of flip-flop 180 from terminal Q is applied to one input and AND gate 182, while the complementary output from the terminal $\overline{Q}$ of flip-flop 180 is applied to one input terminal of AND gate 184. The second input terminal of AND gates 182 and 184 are both connected to the Probe f Base Line Counter signal, shown in FIG. 4 and described below as the probe frequency divided by 100. The output terminals of AND gates 182 and 184 are connected respectively to base line counters 186 and 188 for alternately accumulating the base line frequency, which is proportional to the base line conductivity for the period of time determined by the time base select switch 28. The output terminals of counters 186 and 188 are connected to cascade connected comparators 190, 192 and 194. The output of terminal A3 of comparator 194 is connected to one input terminal and AND gate 196, and the output terminal B3 of comparator 194 is connected to one input terminal of AND gate 198. The second input terminal of AND gate 196 is connected to the Q output terminal of flip-flop 180, and the second input of AND gate 198 is connected to the complementary $\bar{Q}$ output terminal of flip-flop 180. The output of AND gates 196 and 198 is applied to the input terminals of OR gate 200.

The reset terminals of counters 186 and 188 are connected to the output terminals of OR gates 202 and 204. One input terminal of OR gates 202 and 204 is connected to the Master Reset signal, which signal is also applied to the S terminal of flip-flop 180. The second input terminal of OR gate 202 is connected to the output of AND gate 206, which has one input terminal connected to the Base Line Counter Reset signal and the second input terminal connected to the Q output terminal of flip-flop 180. The Base Line Counter Reset signal is also connected to the reset terminal of flip-flop 180 through resistor 208 for resetting the time base to 0. The reset terminal R of counter 120 is connected through capacitor 210 to grounmd. The OR gate 204 has its second input terminal connected to the output of AND gate 212, which has one input terminal connected to the complementary $\bar{Q}$ output terminal of flip-flop 180 and the second input terminal connected to the Base Line Counter Reset signal.

An OR gate 213 has one input terminal connected to the Master Reset signal, a second input terminal connected to the base Line Counter Reset signal, and a third input signal connected to the reset terminal of counter 140. The output of OR gate 213 is applied as the Excess Slope Reset signal to the excess slope detector 60 illustrated in FIG. 4 and described below.

Also illustrated in FIG. 3 is the circuitry for battery check/ready light circuit 26. A 12-volt DC power source is connected through a Zener diode 214 through resistor 216 to ground. This Zener diode 214 is also connected to resistor 218 through the two input terminals of AND gate 220 and through resistor 222 to one input terminal of the NOR gate 224. The other input terminal of NOR gate 224 is connected to the Q4 output of counter 120. The output of NOR gate 224 is tied to an input of NOR gate 226. The outputs of the D terminal and $\bar{Q}$ terminal of flip-flop 180 are tied through capacitor 228 to the input terminal of NOR gate 230, which has its output connected to NOR gate 232 to form a base line complete latch. The output terminal of NOR gate 230 is applied as the complementary Base Line Complete signal to the remainder of the circuit, and the output terminal of NOR gate 232 is applied as the Base Line Complete signal to the remainder of the circuit. The input terminal of NOR gate 230 is tied to ground through resistor 234. The output terminal of NOR gate 230 is also connected to an input terminal of NOR gate 226. The third input termianl of NOR gate 226 receives an Electrolyte Start signal from the circuitry illustrated in FIG. 4 and described hereinbelow. The output of NOR gate 226 is applied through resistor 236 and Zener diode 238 to the base of the PNP transistor 240. The emitter of the transistor 240 is tied to the base through resistor 242. The collector of transistor 240 is connected to a light emitting diode 27 having its cathode terminal connected through resistor 244 to ground.

The Electrolyte Start signal is also applied through a diode 246, having its cathode grounded through resistor 248, to the B input terminal of single shot 124 for shutting off the slope detector 58 after an electrolyte has been detected.

Figure 4:
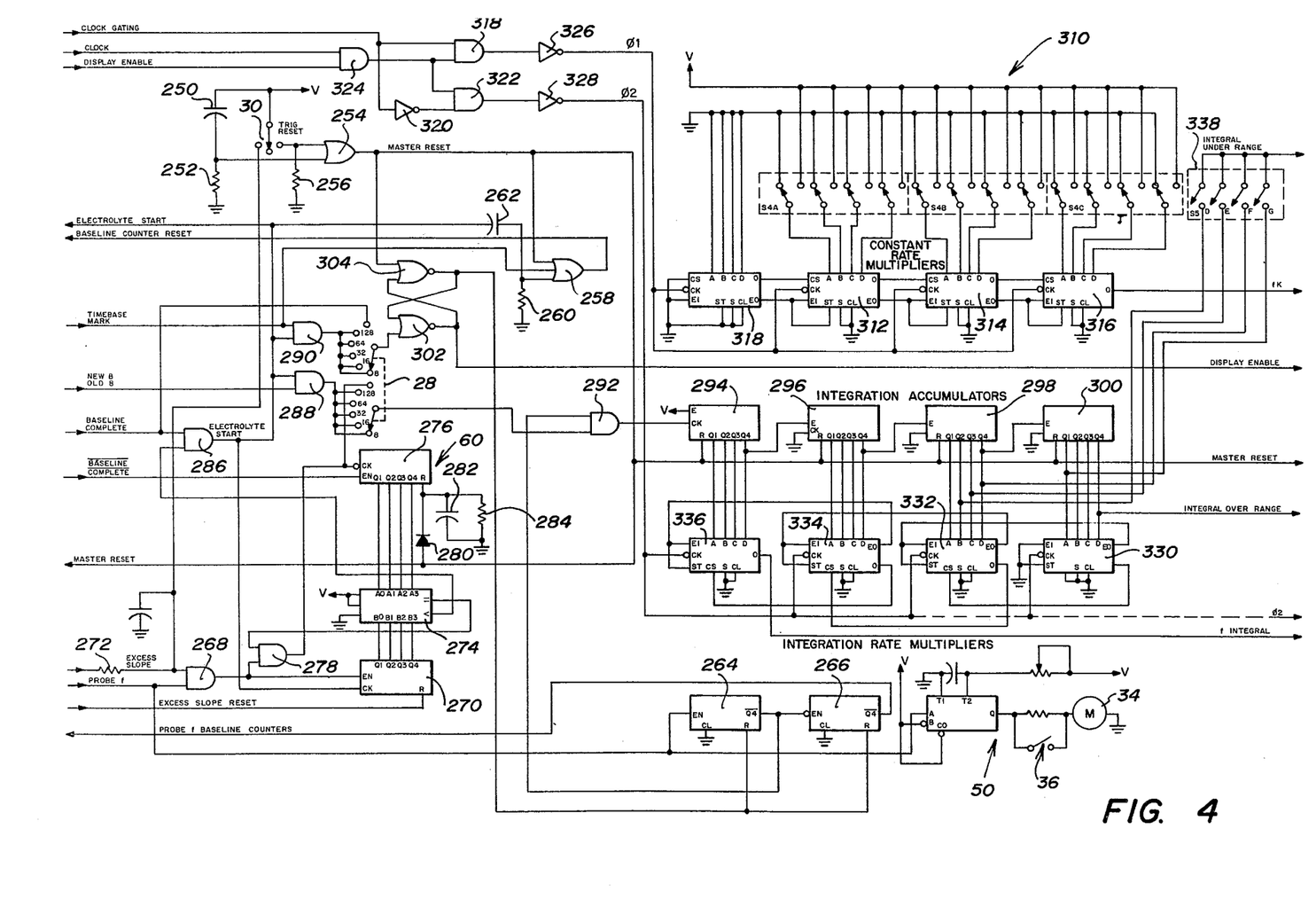
FIG. 4 is a schematic diagram of the digital circuitry of the preferred embodiment of the invention, including the integration accumulators and integration rate multipliers.

FIG. 4 is a detailed schematic view of the electrical circuit of the preferred embodiment of the digital flow meter 10 including the master reset circuitry, integration complete latch circuitry, excess slope detector, constant K1 input switch, integration accumulators, integration rate multipliers, probe frequency converters and the conductivity meter 34.

The trigger/reset switch 30 is connected to the flow meter power supply and tied to ground through capacitor 250 and resistor 252. Trigger/reset switch 30 may be closed to the "reset" position to connect the power supply for the flow meter 10 through one input of reset OR gate 254, which has the same input terminal connected to ground through resistor 256. The other input terminal of OR gate 254 is connected through resistor 252 to ground. The output of OR gate 254 is applied as the Master Reset signal to the remainder of the electrical circuitry illustrated in FIGS. 3, 4 and 5.

The Master Reset signal from OR gate 254 is also applied to an input terminal of OR gate 258, which has its output connected to the Base Line Counter Reset signal applied as illustrated in FIG. 3 and described above. A second input terminal of OR gate 258 is applied from the Time Base Mark Signal illustrated in FIG. 3 and described above. The third input terminal of OR gate 258 is tied to ground by resistor 260 and connected to the Electrolyte Start signal through capacitor 262.

The trigger/reset switch 30 may also be closed to the "trigger" position for manually triggering the integration of the conductivity when the change in slope of the frequency is too small to generate the Excess Slope signal. The "trigger" signal from the trigger/reset switch 30 is connected to the input terminal of an AND gate 268 (described below) for enabling the excess slope detector circuit 60.

The output signal from the probe 14 of frequency "f" is applied through AND gate 150 to a divide by 10 flip-flop 264 which is cascaded with divide by 10 flip-flop 266, where the $\bar{Q}$ output of flip-flop 266 is applied as the Probe f Base Line Counters signal to AND gates 182 and 184 of base line counters 186 and 188, illustrated in FIG. 3 and described above. The Probe f output signal of the probe 14 is also applied to the frequency to conductivity converter circuit 50, including the conductivity meter 34 with the scale switch 36.

The output signal of the probe 14 is also applied through one terminal of AND gate 268, which has its output terminal connected to a first binary counter 270. The second input terminal of AND gate 268 is connected through resistor 272 to the output terminal of OR gate 166 of the frequency slope detector 58, illustrated in FIG. 3 and described above. The output terminals Q1–Q4 of the counter 270 are connected to the input terminals B0–B3 of comparator 274. A second binary counter 276 of the excess slope detector 60 has its clock input terminal connected to the output terminal of an AND gate 278, which has one input terminal connected to the output of AND gate 268 and the second input terminal connected to an output terminal of the comparator 274. The output terminals Q1–Q4 of counter 276 are applied to the input terminals A0–A3 of comparator 274. The reset terminals of counter 270 are connected to the Excess Slope Reset signal illustrated in FIG. 3 and described above, while the reset terminal of counter 276 is connected to the Master Reset signal from OR gate 254 through diode 280, where the reset terminal is tied to ground through parallel connected capacitor 282 and resistor 284. The complement of the Base Line Complete signal from NOR gate 232 is applied to the EN terminal of counter 276. The other output terminal of the comparator 274 is connected to one input terminal of AND gate 286. The other input terminal of AND gate 286 is connected to the Base Line Complete signal from the output terminal of NOR gate 230, illustrated and described above in FIG. 3. The first counter 270 counts up the Probe f signal for the ¼th of a second the Excess Slope signal is enabled and the comparator "=38 terminal places the same count into the second counter 276 if the two counters 270 and 276 are equal. If the new count in the first counter 270 is greater than the previous maximum charge in slope stored in the second counter 276, then an electrolyte has been detected and a signal is applied to AND gate 286 to apply the Electrolyte Start signal to the remainder of the flow meter 10.

The output of the AND gate 286 is the Electrolyte Start signal which is applied to the circuitry illustrated in FIG. 3 and described above. The Electrolyte Start signal from the AND gate 286 is also applied to the input terminal of AND gate 288 and AND gate 290. The second input terminal and AND gate 288 is applied from the output of OR gate 200 of the base line counters and comparators circuit 62 as the New B>Old B signal, illustrated and described above in FIG. 3. The New B>Old B signal is generated when the new count in the base line counter exceeds the old count. The output of the AND gate 288 is applied through switch 28 as the second input terminal to the AND gate 292, which has its output tied to the clock input signal of the cascade connected integration accumulators 294, 296, 298 and 300. Thus, the integration accumulators do not begin to accumulate the output frequency from the probe 14 until the Electrolyte Start signal indicates the beginning of the increased conductivity in the fluid caused by the presence of the electrolyte, and the contents of the base line counter B exceeds the contents of the previous base line counter (186 or 188) to thereby automatically subtract the base line conductivity, the conductivity of the fluid.

The Time Base Mark signal illustrated in FIG. 3 and described hereinabove, is applied through switch 28 to the second input terminal of AND gate 290 which has its output connected to one input terminal of NOR gate 302. NOR gate 302 has its output connected to an input terminal of NOR gate 304. The output of NOR gate 302 is also applied as the display enable signal to enable the digital display 32, illustrated and described below in FIG. 5.

A binary coded decimal thumb switch 310 presets the contant K1 into the input terminals of cascade connected constant rate multipliers 312, 314 and 316. $K1 = E/K$ and is determined by the number of equivalents of electrolyte to be introduced into the fluid. The input terminal of rate multiplier 312 is connected to the output of a rate multiplier 318, having its input connected to ground, which is equivalent to presetting a "0" into the rate multiplier 318. The clock gating signal from flip-flop 118, illustrated in FIG. 3, is applied to one input terminal of AND gate 318 and to inverter 320 having its output connected to an input terminal of AND gate 322. The clock signal from oscillator 116 and the Display Enable signal from NOR gate 302 are the input terminals of AND gate 324. The output of AND gate 324 is applied to the input terminals of AND gates 318 and 322. The outputs of AND gates 318 and 322 are applied through inverters 326 and 328, respectively. The clock output signal "PHI 1" and the clock output signal "PHI 2" from inverter 328 are thus nonoverlapping clock signals having the same frequency but shifted in phase.

Figure 5:
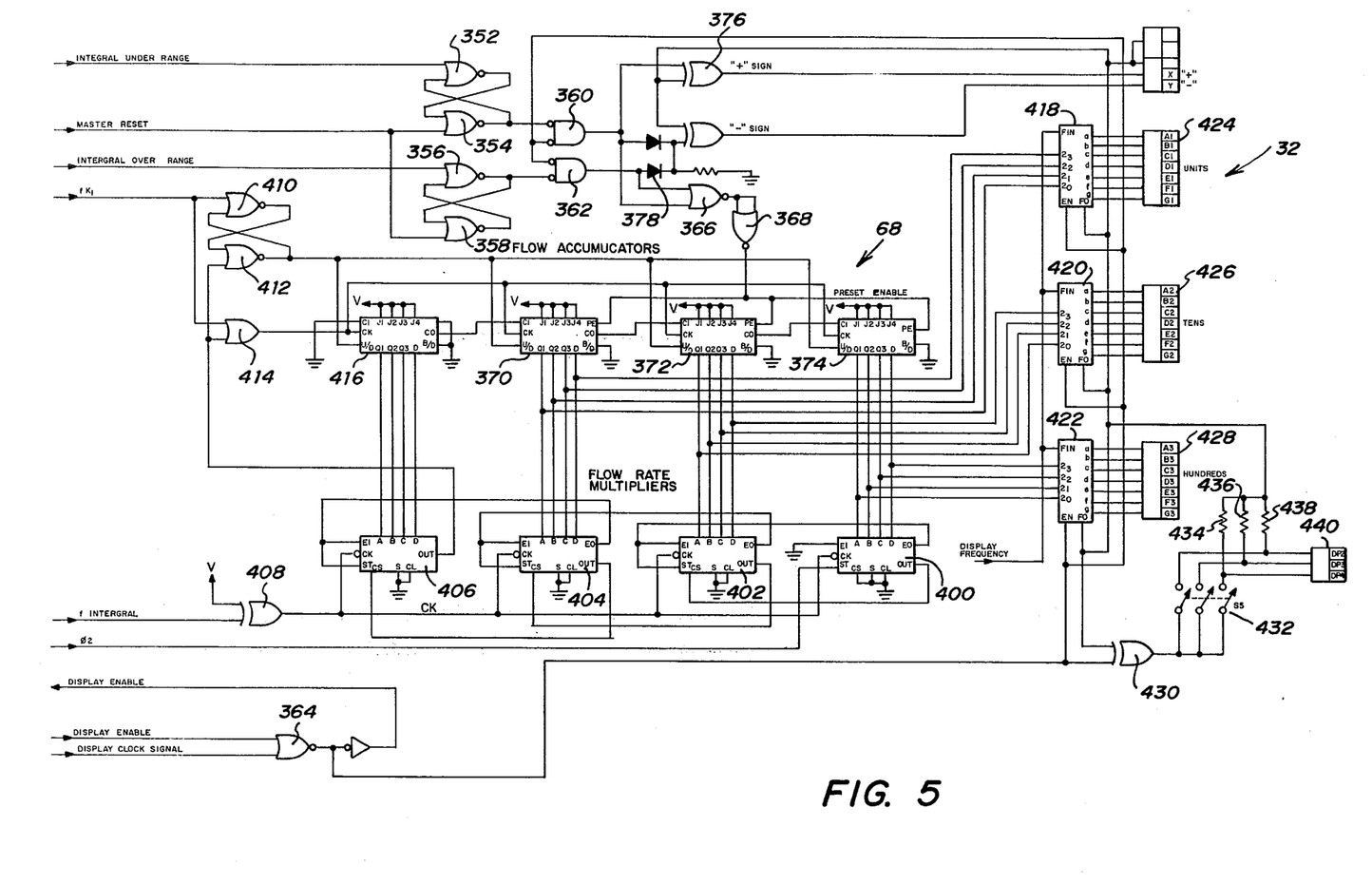
FIG. 5 is a schematic diagram of the digital circuitry of the preferred embodiment of the invention, including the flow accumulators, flow rate multipliers and digital display.

The clock pulse signal "PHi 1" is applied to the clock input terminal of rate multiplier 318 which is cascade connected through the rate multipliers 312, 314 and 316 to yield the constant "f K1" at the output terminal of multiplier 316. As illustrated in FIG. 5 and described hereinbelow, the value of K1 is divided by the integral of the change in conductivity for the time base period selected to calculate a direct reading of the volumetric flow rate. The flow meter 10 operates to solve the well known equation $$E = KQ \int_0^t L\,dt,$$

as these terms are defined hereinabove.

The second clock pulse signal "PHI 2" is applied as the input signal to the clock terminals of cascade connected integration rate multipliers 330, 332, 334 and 336. The output terminals Q1–Q4 of accumulators 294–300 are applied as the input to multipliers 330–336. The integration rate multipliers 330–336 are cascade connected such that the output of rate multiplier 330 is connected to the input of rate multiplier 332 and so on. Finally, the output of the last integration rate multiplier 336 (f Integral) is the integral of the change of conductivity for the time base period.

The value of the integral under range may be preset through switch 338 to the selected output lines of the integral accumulators 298 and 300. Since the integral of the electrolyte conductivity is to be divided into K1, the value of the integral under range is selected so that the integral is greater than K1. Thus, the quotient will not exceed the capacity of display 32. The Integral Over Range signal is generated by the presence of an output from terminal Q4 of the last integral accumulator 300, which means the integral in this circuit 64 may not exceed 8,000. Of course, the limiting value selected for the Integral Over Range limit may be other than the number 8,000.

FIG. 5 illustrates in schematic detail the electrical circuitry for the remainder of the digital volumetric flow meter 10, including the divide constant "K1" by integral circuitry 68 and the digital display circuitry 32.

The Integral Under Range signal is applied to the first input terminal of NOR gate 352, where NOR gate 352 has its output connected to the input of NOR gate 354 to form an integral under range latch. The Master Reset signal is applied to the second input terminal of NOR gate 354 for resetting the integral under range latch.

The Integral Over Range signal is applied to a first input terminal of NOR gate 356, where the output terminal of NOR gate 356 is applied to one of the input terminals of NOR gate 358, where the output of NOR gate 358 is applied to the second input terminal of NOR gate 356 to form an integral over range latch. The Master Reset signal is applied to the second input terminal of NOR gate 358 for resetting the integral over range latch.

The output of integral under range NOR gate 354 is applied to the input terminal of AND gate 360. Similarly, the output of integral over range NOR gate 356 is applied to one input terminal of AND gate 362. The second input terminals of AND gates 360 and 362 are connected to the output terminal of display enable NOR gate 364, which has its input terminals connected to the Display Enable signal and to an output terminal of counter 120.

The output signals from NOR gates 360 and 362 are applied to the two input terminals of preset enable NOR gate 366, which has its output connected to the two input terminals of NOR gate 368 to provide a Preset Enable signal to the flow accumulators 370, 372 and 374. The output of NOR gate 360 is also applied to an input terminal off exclusive OR gate 376. The output signal from NOR gate 360 is applied through diode 378 to one input terminal of exclusive OR gate 380, which has this input terminal tied to ground through resistor 382. The output signal from NOR gate 362 is also applied through a diode 384 to the same input terminal of exclusive OR gate 380. The output of the exclusive OR gate 380 is applied to display a "−" sign in the display unit 386 to indicate less electrolyte should be used in a subsequent measurement. The output of the exclusive OR gate 376 enables the display unit 386 to display a "+" sign to indicate more electrolyte is to be added in a subsequent measurement. Of course, the trigger/reset switch 30 should be closed to the "reset" position to apply the Master Reset signal to the circuitry of flow meter 10 before conducting a subsequent measurement.

the "PHI 2" clock signal is applied to the ST input terminal of cascade connected flow rate multipliers 400, 402, 404, and 406. The "f integral" signal from the integration rate multiplier 336 is applied through exclusive OR gate converter 408 to the clock terminals of flow rate multipliers 400, 402, 404, and 406.

The fK1 signal is applied from the output terminal of constant rate multiplier 316, illustrated in FIG. 4 and described above, to one input terminal of NOR gate 410, which has its output terminal connected to an input terminal of NOR gate 412, thereby forming a latch. The fK1 signal is also applied to one input terminal of OR gate 414. The output from the last flow rate multiplier 406 is applied to both the second input terminal of OR gate 414 and the second input terminal of NOR gate 412. The output of NOR gate 412 is applied to the up or down counter terminal U/D of flow accumulators 370, 372, 374 and 416. The output terminals Q1, Q2, Q3 and D of flow accumulators 370, 372, 374 and 416 are applied to the input terminals of flow rate multipliers 400–406. The flow accumulators 370, 372, 374 and 416 and flow rate multipliers 400–406 operate to calculate the division of the integral of conductivity for the time base into the constant K1 to give a direct reading of the volumetric flow rate. If "f integral" is greater than fK1, the flow accumulators 370, 372, 374 and 416 count down until the output frequency from the flow rate multipliers 400–406 equals fK1. Similarly, if "f integral" is less than fK1, the flow accumulators 370, 372, 374 and 416 count up until the output frequency from the flow rate multipliers 400–406 equal fK1. In this manner of operation, the volumetric flow rate is calculated.

The outputs from flow accumulators 370, 372, and 374 are applied to the input terminals of "units" display driver 418, "tens" display driver 420 and "hundreds" display driver 422. The frequency of display drivers 418, 420 and 422 is determined by the Display Frequency signal applied to the "Fin" terminals. The drivers 418, 420 and 422 are enabled by the output signal from the display enable NOR gate 364. The output of the units driver 418 is applied to the seven segment liquid crystal "units" display 424, the output of the driver 420 is applied to the seven segment liquid crystal "tens" display 426, and the output from driver 422 is applied to the seven segment liquid crystal "hundreds" display 428. Of course, the flow meter 10 may utilize any display compatible with its digital circuitry, including light emitting diodes.

The output from the display enable NOR gate 364 is also applied to an input terminal of exclusive OR gate 430 having its output connected to the decimal point selector switch 432. The decimal point selector switch 432 applies the Display Enable signal through either resistors 434, 436 or 438 to the "FO" terminal of the drivers 418, 420 and 422. The decimal point is then selectively displayed in either the units, tens, or hundreds position on the decimal point display 440.

In operation of the system, the digital volumetric flow meter 10 is energized when the conductivity probe 14 is plugged into the flow meter 10. The time base is initially set at 8 seconds to check the battery level. Upon completion of the time base period of 8 seconds, the ready light 27 should be illuminated to indicate that the 12-volt DC battery is charged and that counters and comparators circuit 62 has completed one time base. A 12-volt rechargeable lead/acid seal cell has proved satisfactory for reliable operation. The probe 14 may then be placed directly into the flowing stream of fluid to be measured. The time base selector switch 28 is then set on the period of time for which the base line conductivity is to be measured, which is also the period of time for integrating the change in conductivity occurring in the fluid.

Once the probe 14 is disposed in the fluid, the conductivity of the fluid between the platinum electrodes 80 and 82 determines the output frequency of oscillator 84. As the conductivity of the fluid increases, the frequency of the probe oscillator 84 increases in direct proportion. The frequency of the output signal from the probe 14 may thus be used to calculate the volumetric rate of flow in the digital flow meter 10. The temperature compensation resistor circuit 102 adjusts the output frequency oscillator 84 to compensate for variations in the conductivity of the solution caused by the temperature of the fluid.

The output of the probe frequency 14 is applied to the frequency to conductivity circuit 50 to provide a direct visual reading of the conductivity of the fluid in micromhos on meter 34. The conductivity scale selector switch 36 may be used to keep the base line conductivity reading about mid-scale. The base line conductivity initially noted on the display 34 to the conductivity of the fluid before the electrolyte has been added. As an example, a typical flowing fluid in which the flow meter 10 would be used, a sewer stream, usually has a base line conductivity between 200 and 1000 micromhos.

The precise measurement of the flow rate can be expedited by first establishing the approximate amount of electrolyte needed for the quantity of the flow. The constant K1 which has been preset into the flow meter through BCD switch 310 is based on factory calibrations of the flow meter for a premeasured quantity of electrolyte. Thus, by using the premeasured package of electrolyte, the digital display 32 provides a direct reading of the volumetric flow rate. If additional electrolyte is needed to provide an accurate intergral of the change in conductivity for the base line period, intergral multiples of the electrolyte may be introduced in the fluid, and the reading on the digital display 32 then can be multiplied by the integral number of electrolytes added to calculate the volumetric flow rate. For example, the premeasured package of electrolyte may be a sufficient quantity for flow rates up to 1000 gallons per minute. For flow rates between 500 and 10,000 gallons per minute, 10 premeasured packages of electrolyte may be necessary to be introduced into the fluid. In the first estimate of the amount of electrolyte needed is in error, the digital display 32 will display a "+" sign when the amount of electrolyte should be increased and a "−" sign when the amount of electrolyte should be decreased.

The electrolyte should be introduced into the flowing fluid at a point sufficiently downstream from the probe 14 to allow all the electrolyte to dissolve. The velocity and temperature of the flowing fluid will have an effect on the distance and time necessary for the electrolyte to enter into solution.

For a first reading, the time base select switch should be set on the maximum of 128 seconds to insure that the probe 14 has sufficient time to detect all of the electrolyte. The conductivity meter 34 should be observed to determine the conductivity peak width for subsequently resetting the time base selector switch 28 to a shorter period of time, but a time slightly greater than the time measured for the conductivity peak width. The reset switch 30 may then be depressed to reset the flow meter 10 for a subsequent test which should yield more accurate readings.

Whereas, the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A method for measuring the volumetric rate of flow of a flowing fluid, comprising:
   placing a conductivity probe into the flowing fluid, said probe having an oscillator with a frequency proportional to the conductivity of the fluid,
   determining the base line conductivity of the fluid,
   introducing a predetermined quantity of a known electrolyte material into the flowing fluid at a point upstream from the conductivity probe,
   determining a flow rate constant based on the number of equivalents of the known electrolyte introduced into the flowing fluid,
   accumulating the base line conductivity as measured by the frequency of the output signal of the oscillator for a predetermined period of time,
   determining the integral of the fluid conductivity caused by the electrolyte and the fluid for said predetermined period of time,
   automatically subtracting the accumulation of the base line conductivity from said integral of the fluid conductivity for said predetermined period of time such that said integral of change of conductivity which is caused solely by the electrolyte material for said period of time is determined,
   dividing said flow rate constant by said integral of the change of conductivity caused by the electrolyte for calculating the volumetric flow rate of the fluid, and
   displaying the calculated volumetric flow rate.

2. The method of claim 1 for measuring the volumetric rate of flow of a fluid, and further comprising:
   automatically compensating for the increase in said signal frequency attributable to the variations in the temperature of the fluid.

3. The method of claim 1 for measuring the volumetric rate of flow of a fluid and further comprising:
   comparing said integral of the change of the conductivity caused by the electrolyte material with an upper limiting value for determining whether the number of equivalents of the electrolyte should be decreased, and
   displaying an indication that the number of equivalents of electrolytes should be decreased if said integral exceeds said upper value.

4. The method of claim 3 for measuring the volumetric rate of flow of a fluid, and further comprising:
   resetting said base line conductivity accumulators and said integral of the change of conductivity caused by the electrolyte material,
   introducing a second predetermined quantity of a known electrolyte material less than said first predetermined quantity of electrolyte material into solution at a point upstream from said conductivity probe, and
   multiplying the displayed calculated volumetric flow rate obtained for said second quantity of electrolyte material by the ratio of the quantity of said second predetermined quantity of electrolyte to the quantity of said first predetermined electrolyte for obtaining the volumetric flow rate.

5. The method of claim 1 for measuring the volumetric rate of flow of a fluid and further comprising:
   comparing said integral of the change of the conductivity caused by the electrolyte material with a lower limiting value for determining whether the number of equivalents of the electrolyte should be increased, and
   displaying an indication that the number of equivalents of electrolytes should be increased if said integral is less than said lower limiting value.

6. The method of claim 5 for measuring the volumetric rate of flow of a flowing fluid, and further comprising:
   resetting said base line conductivity accumulators and said integral of the change of the conductivity caused by the electrolyte material,
   introducing a second predetermined quantity of electrolyte material greater than said first predetermined quantity of electrolyte material into solution at a point upstream from said conductivity probe, and
   multiplying the displayed calculated volumetric flow rate for said second quantity of electrolyte material by the ratio of the quantity of the second predetermined quantity of electrolyte to the first predetermined quantity of electrolyte for determining the volumetric flow rate.

7. The method of claim 1 for measuring the volumetric rate of flow of a fluid, and further comprising:
   determining the conductivity of the fluid from the output signal of said oscillator, and displaying said determined value of conductivity to measure the conductivity peak width for determining said predetermined period of time.

8. The method of claim 7 for measuring the volumetric rate of flow of a fluid and further comprising:
selecting said predetermined period of time as the shortest time exceeding the period of time said conductivity peak width passes said probe.

9. A digital volumetric flow meter for determining the volumetric flow rate of a fluid, comprising:
conductivity measuring means including temperature compensating means for measuring at a point the change in electrical conductivity of the fluid produced by introducing a predetermined quantity of electrolyte upstream from said point for increasing the electrical conductivity of the fluid,
means for storing a predetermined constant in the flow meter determined by the number of equivalents of electrolyte introduced into the fluid,
digital circuit means for accumulating the base line conductivity of the fluid before introducing the electrolyte into the fluid,
digital circuit means for integrating the change in conductivity in the fluid caused by said electrolyte for the period of time the electrolyte flows past said point, including means for automatically eliminating the base line conductivity of the fluid, and
digital circuit means for dividing said constant by said integral of the change in conductivity caused by said electrolyte for automatically calculating the volumetric flow rate of the fluid.

10. The digital volumetric flow meter of claim 9, wherein said means for storing said constant is a binary coded decimal switch for presetting the constant into the digital flow meter.

11. The digital volumetric flow meter of claim 9, and further comprising:
means for indicating that the quantity of electrolyte introduced in solution is within a predetermined upper and lower range.

12. The digital volumetric flow meter of claim 9, wherein said conductivity measuring means including temperature compensating means for measuring the change in electrical conductivity of the fluid includes an oscillator connected to electrodes for insertion within the fluid, said oscillator having an output signal of a frequency directly proportional to the conductivity of the fluid.

13. The digital volumetric flow meter of claim 12, wherein said temperature compensating means includes a resistance bridge network including a thermistor coupled to said oscillator for varying the output frequency of said oscillator to compensate for changes in conductivity produced by temperature variations of the fluid.

14. The digital volumetric flow meter of claim 13, and further comprising:
means for detecting the slope of the output frequency of said oscillator, including means for detecting a change in the slope of the frequency exceeding a prior maximum change in the slope of the frequency,
two base line counters for accumulating in each of said counters for a predetermined period of time the base line conductivity determined from the frequency of said oscillator,
means for comparing the numbers stored in said base line counters,
said means for integrating the change in the conductivity caused by said electrolyte includes means for accumulating the conductivity of the fluid for the time base period which is reset when said excess slope detector indicates the beginning of said electrolyte in the solution, including means for subtracting the base line conductivity as represented by the number in one of said base line counters for automatically determining said integral,
means for dividing said predetermined constant by said integral of the change in conductivity caused by the electrolyte for determining the volumetric flow rate of the fluid.

15. The digital volumetric flow meter of claim 14, and further comprising means for resetting said base line counters and said integral accumulators for making subsequent determinations of the volumetric rate of flow of the fluid.

16. The digital volumetric flow meter of claim 15, and further comprising means for comparing said integral of conductivity caused by the electrolyte with predetermined upper and lower limits for determining if the quantity of electrolyte introduced was within said upper and lower limits, and
means for displaying that the quantity of material was not within said upper and lower limits.

17. The digital volumetric flow meter of claim 9, and further comprising:
a conductivity meter for directly displaying the conductivity of the fluid for determining the conductivity peak width associated with the passage of the electrolyte in solution with the fluid.

18. The digital volumetric flow meter of claim 17, and further comprising means for selecting said time base for accumulating the base line conductivity and the period of time for integrating the change in conductivity caused by the electrolyte, said time base being selected to exceed the conductivity peak width.

19. A digital volumetric flow meter for measuring the rate of flow of a fluid, comprising:
a conductivity sensitive probe having an oscillator connected to a pair of electrodes, said oscillator having an output frequency directly proportional to the conductivity of the fluid between said electrodes for measuring the change in conductivity occurring in the fluid upon the introduction of a predetermined quantity of a material which will alter the electrical conductivity of the fluid,
means for presetting a flow constant into the meter, the value of said constant being determined by the quantity of the material introduced to alter the conductivity of the fluid,
means for detecting a change in the slope of the output frequency of said oscillator, including means for detecting when said change in slope of the frequency exceeds a previous maximum,
two base line conductivity accumulators for alternately accumulating the base line conductivity of the fluid from the frequency of said oscillator for a predetermined time base,
means for selecting the period of time for accumulating said base line conductivity,
means responsive to said excess slope indicator for resetting said time base for one of said base line conductivity accumulators,
means for determining when said second base line conductivity accumulator exceeds said first base line conductivity accumulator, means for accumulating the conductivity of the electrolyte in solution with the fluid from the output frequency of said oscillator for said time base when said means for determining indicates said second base line accumulator exceeds said first base line accumulator such that said integral of the change of the conductivity caused by said material is thereby determined, means for dividing said flow constant by said integral of the change in conductivity for determining the volumetric flow rate of the fluid, and means for providing a digital display of the volumetric flow rate.

20. The digital volumetric flow meter of claim 19, wherein said conductivity sensitive probe includes means for compensating for changes in conductivity caused by temperature variations in the fluid.

21. The digital volumetric flow meter of claim 19, and further comprising:

means for determining the conductivity of said fluid at the point said probe is introduced into the fluid, and means for displaying said determined conductivity of the fluid for determining the conductivity peak width associated with the passage of the material in the fluid introduced to alter the conductivity of the fluid.

22. The digital volumetric flow meter of claim 21, and further including means for selecting said predetermined time base to exceed the conductivity peak width.

23. The system of claim 22 for determining the volumetric flow rate of a fluid, and further comprising:

means for determining the conductivity peak width produced by the passage of said material altering the conductivity of the fluid, and means for selecting said period of time to exceed period of time determined by said conductivity peak width.

24. A system for determining the volumetric flow rate of a flowing fluid, comprising:

means for selectively depositing in the flowing fluid a predetermined quantity of material which will alter the electrical conductivity of the fluid, means for storing a flow constant associated with said predetermined quantity of material, temperature compensating conductivity probe means for being disposed downstream of said depositing means to detect the electrical conductivity of the fluid, said probe means including an oscillator having an output signal frequency directly proportional to the conductivity of the fluid, means for determining the integral of the change in conductivity for a predetermined period of time from said oscillator output signal frequency, said increase in conductivity being caused solely by the introduction of the material into the flowing fluid, and means for dividing said flow constant by said integral of the change in conductivity for determining the volumetric flow rate of the fluid.

25. The system of claim 24, wherein said probe means includes a thermistor and a resistance bridge network coupled to said oscillator for adjusting the output frequency of said oscillator to compensate for the changes in conductivity produced by the temperature variations of the fluid.

26. The system of claim 24 for determining the volumetric flow rate of a flowing fluid, and further comprising:

means for resetting the system for introducing a second predetermined quantity of material which will alter the electrical conductivity of the fluid, and multiplying the volumetric flow rate displayed by the system by the ratio of the quantity of the second predetermined quantity of material to said first predetermined quantity of material.

* * * * *

UNITED STATES PATENT AND TRADEMARK OFFICE
CERTIFICATE OF CORRECTION

PATENT NO. : 4,136,563
DATED : January 30, 1979
INVENTOR(S) : Frederick N. Mueller, et al.

It is certified that error appears in the above-identified patent and that said Letters Patent are hereby corrected as shown below:

Col. 6, line 59, change "input and AND" to --input of AND--.

Col. 7, line 6, change "and" to --of--;
line 28, change "grounmd" to --ground--;
line 36, change "base" to --Base--;
line 62, change "termianl" to --terminal--.

Col. 9, line 18, change "=38 to --"="--.

Col. 10, line 13, change "PHi 1" to --"PHI 1"--.

Col. 11, line 19, change "off" to --of--;
line 35, change "the" to --The--.

Col. 13, line 14, change "In" to --If--.

Signed and Sealed this

Seventeenth Day of July 1979

[SEAL]

Attest:

LUTRELLE F. PARKER
Attesting Officer    Acting Commissioner of Patents and Trademarks